3,311,796
RELAY CIRCUIT
Wallace P. Mercer III, Prince William County, Va., assignor to Atlantic Research Corporation, Fairfax County, Va., a corporation of Virginia
Filed Aug. 28, 1964, Ser. No. 392,721
8 Claims. (Cl. 317—155.5)

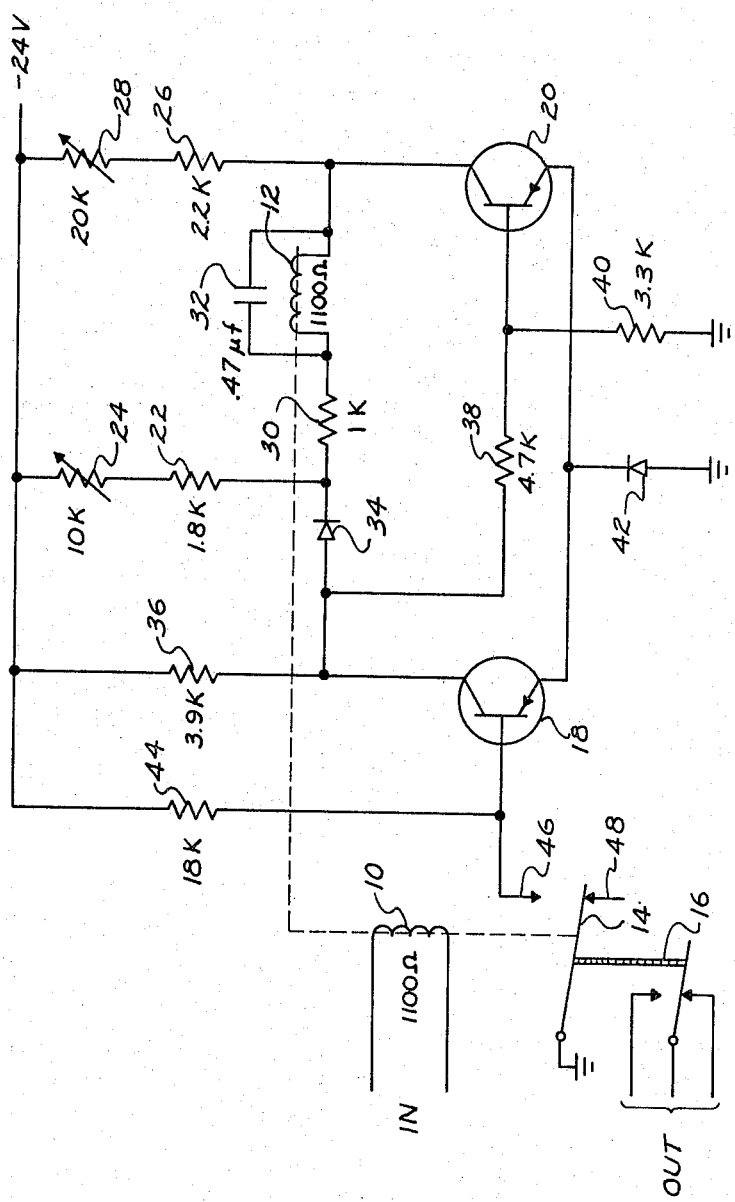
INVENTOR
WALLACE P. MERCER III
BY *Tipton D. Jennings*
ATTORNEY

The present invention relates to a relay circuit and more particularly to a circuit for controlling operation of a relay.

In the operation of relays it is known that the pull-in current and the drop-out current of a relay will differ. This is due to relay hysteresis and the difference is usually characterized by the need of a larger current to pull-in or actuate the relay and a lesser current to drop-out or release the relay.

Furthermore, if the relay is used in a circuit where the input is in the form of a pulse wave such as found in telegraph circuits, distortion of the pulse can lead to errors in the operate time of the relay. Such errors can be held to a minimum if the relay can be made to operate at a precise point such as the half-current point in a neutral system or the zero level in a polar system.

Accordingly, it is an object of the invention to provide a relay circuit for controlling the switching points of a relay.

It is another object of this invention to provide a relay circuit to overcome relay hysteresis and thereby permit the relay to operate at the same or predetermined levels during both pull-in and drop-out of the relay.

Still another object of this invention is to decrease errors caused through distortion of the input signal to the relay by the provision of a relay control circuit for selecting the optimum switching levels for the relay.

Other objects and advantages of this invention will become apparent upon a reading of the following specification in conjunction with the sole figure showing a schematic of the preferred embodiment of the invention.

Referring now to this figure, there is shown schematically a double-winding bipolar relay composed of a line winding 10 connected to receive the incoming signals, an auxiliary winding 12 and a pivoted armature 14. There is also shown connected to the armature 14 an insulated bushing 16 which is moved by the armature 14 to operate the transfer contacts and thereby the switching within an output circuit.

The auxiliary winding 12 is connected at each end into a switching circuit which controls the flow of current through this winding. Within the circuit the connection of winding 12 is made between the output circuits of transistor 18 and transistor 20. For transistor 18 the output circuit comprises its collector, fixed resistor 22, and variable resistor 24. The output circuit of transistor 20 is also its collector circuit and consists of this collector, fixed resistor 26, and variable resistor 28. Both variable resistors 24 and 28 are connected to negative battery. Resistor 30 is connected in series with auxiliary winding 12 and a capacitor 32 shunts this winding to delay flux reversal therein as hereinafter described.

Diode 34 is included to isolate the collector of transistor 18 when this transistor is nonconducting to provide a constant bias, as determined by resistors 36, 38, and 40, at the base of transistor 20. The emitters of transistors 18 and 20 are connected to ground through diode 42. The base of transistor 18 is biased by resistor 44 connected to negative battery. The base of transistor 18 can also be grounded by the movement of armature 14 against contact 46 from open contact 48.

To better understand the operation of the invention, assume winding 10 is connected to a 60 milliamp neutral telegraph circuit. In this circuit the input current will swing from zero to 60 milliamps during a signal condition and will fall back to zero at the termination of the signal. The telegraph pulses are ideally square waves but inherent delays in the telegraph system generally distort the pulses such as by rounding off the edges. Due to this distortion, it is generally recognized that it is preferable to actuate relays and other equipment at the half-current point, here being 30 milliamps. However, it has been found that if a relay is adjusted to actuate or pull-in at the 30 milliamp level then during the drop-out condition the hysteresis of the relay will not permit the relay to drop-out until the current falls well below the 30 milliamp level. Thus for actual operation a compromise is generally instituted by designing or biasing the relay to pull-in above the half-current point and drop-out below the half-current point.

In the present invention the need for this design compromise is essentially eliminated by the use of the switching circuit in association with auxiliary winding 12. With no input signal present at winding 10, armature 14 is in the position shown and the transistor switching circuit is in the state where transistor 18 is conducting and transistor 20 is nonconducting. Current flows from negative battery through adjustable resistor 28, fixed resistor 26, auxiliary winding 12 from right to left as viewed in the figure, resistor 30, diode 34 and conducting transistor 18 to ground through diode 42. The current flow through auxiliary winding 12 creates a flux which acts with the flux created by current flow in winding 10 to control the switching of armature 14. Resistor 28 is adjusted to select the necessary value of current in winding 12 and thereby the flux so that when a signal condition occurs and the current on the line reaches the 30 milliamp level during its excursion to 60 milliamps, the resultant flux in windings 10 and 12 switches armature 14 to contact 46. Since insulated bushing 16 is driven by armature 14 switching will also occur in the output circuit.

When armature 14 meets contact 46 the base of transistor 18 becomes grounded and this transistor cuts off. The collector of transistor 18 rises towards negative battery and the transistor 20 becomes forward-biased causing it to conduct. The collector of transistor 20 drops to near ground potential and current flow in winding 12 begins to reverse direction. Current now can flow from negative battery through adjustable resistor 24, resistor 22, resistor 30, winding 12 from left to right, transistor 20 and to ground through diode 42. Since the current flow in winding 12 is reversing, the direction of flux will also reverse after a slight delay caused by capacitor 32. This delay prevents an instantaneous flux reversal in winding 12 which flux would oppose the flux of winding 10 and cause armature 14 to oscillate or chatter between its contacts. This delay is sufficient to permit the flux in line winding 10 to build up to a value which will hold armature 14 in the presence of the opposing flux.

The current in winding 12 is now controlled by adjustable resistor 24. The value of current is chosen to provide sufficient flux to ensure release of the relay at the half-current point at the end of the signal condition. Thus when the input signal begins its excursion back to the zero level the resultant flux of the two windings 10 and 12 switches armature 14 back to rest contact 48 when the input signal reaches the 30 milliamp level. At this time transistor 18 again becomes forward-biased resulting in the two transistors returning to their original conducting state where transistor 18 is conducting and transistor 20 is nonconducting. Current flow in winding 12 is reversed and the circuit is ready for the next signal condition. The delay caused by capacitor 32 is also effective during this cycle.

The invention shown works equally well in a polar telegraph circuit. In a polar telegraph circuit, it is desirable to have the relay switch at the zero level during the reversal between the negative and positive levels of the square-wave input. Assuming that the input current varies between plus and minus 20 milliamps and that minus 20 milliamps is presently at winding 10 then with the armature 14 against contact 48 transistor 18 is conducting, transistor 20 is nonconducting, and the current flow is from right to left through winding 12. The flux created by winding 12 opposes the flux created in winding 10 by the 20 milliamp current but the resultant flux is insufficient to switch armature 14. When the input signal reverses and the positive excursion begins from the negative 20 milliamp to the positive 20 milliamp level, the resultant flux which occurs when the input current reaches the zero milliamp level causes armature 14 to switch its position to contact 46. The conducting state of transistors 18 and 20 will again reverse, causing a change in the direction of current and the direction of flux in winding 12 after a slight delay caused by capacitor 32. Since the direction of flux in winding 10 has also reversed the two fluxes are again opposed. When the input signal again reverses and the negative excursion from plus 20 milliamps to minus 20 milliamps begins, the resultant flux caused by current flow in the two windings again switches the relay at the zero milliamp level causing armature 14 to leave contact 46 and return to contact 48.

For polar operations, resistors 24 and 28 are adjusted so that approximately the same value of current flows in winding 12 in both directions. For the condition last described these resistors were adjusted to give approximately a 6.5 milliamp current flow using the component values shown in the figure.

By virtue of what has been described it is now readily seen that a relay can also be controlled to operate at different predetermined values of input current. For example, through adjustment of resistors 24 and 28 to obtain the necessary values of current flow and thereby flux in winding 12, the relay can be made to operate at an input level which may be one value for pull-in and a different value for drop-out. Thus, precise control of the relay can be effected.

It will be apparent that various modifications may be made herein within the scope of this invention and it is desired, therefore, that only such limitation be placed on the invention as are imposed by the prior art and set forth in the appended claims.

What is claimed is:

1. A relay circuit comprising a relay having a line winding, an auxiliary winding, and an armature, a switching circuit for reversing the direction of current in said auxiliary winding including two switching means, one of said switching means being designed to operate when said armature is in a first position and the other of said switching means being designed to operate when said armature is in a second position, said auxiliary winding being connected in said switching circuit between said two switching means to control the direction of current flow through said auxiliary winding, the resultant flux caused by the current flow in said auxiliary winding and the current flow in said line winding effecting movement of said armature in response to a predetermined electrical condition in the line.

2. A relay circuit comprising a relay having a line winding, an auxiliary winding, and an armature, a switching circuit for reversing the direction of current in said auxiliary winding including two switching means each having a variable resistor in circuit therewith, one of said switching means being designed to operate when said armature is in a first position and the other of said switching means being designed to operate when said armature is in a second position, said auxiliary winding being connected between the circuits of said two switching means to control the direction of current flow through said auxiliary winding, the value of said current being determined in part by the setting of one of said variable resistors in accordance with the direction of current flow, the resultant flux caused by the current flow in said auxiliary winding and the current flow in said line winding effecting movement of said armature from said first position to said second position in response to a predetermined current level in the line and from said second position back to said first position in response to a predetermined current level in the line.

3. A relay circuit comprising a relay having a line winding, an auxiliary winding, and an armature, a switching circuit for reversing the direction of current in said auxiliary winding including two switching means each having a variable resistor in its output circuit, one of said switching means being designed to conduct when said armature is in a first position and the other of said switching means being designed to conduct when said armature is in a second position, said auxiliary winding being connected across the output circuits of said two switching means and having the direction of current flow therethrough determined by the conducting-nonconducting relationship of said two switching means and having the value of said current determined in part by the value of the variable resistor in the output circuit of the nonconducting switching means, the resultant flux caused by the current flow in said auxiliary winding and the current flow in said line winding effecting movement of said armature from said first position to said second position in response to a current rise in said line to a predetermined level and from said second position back to said first position in response to a current drop in said line to a predetermined level.

4. A relay circuit comprising a relay having a line winding, an auxiliary winding, and an armature, a switching circuit for reversing the direction of current in said auxiliary winding including transistor means for causing current flow through said winding in one direction when said armature is in a first position and in the opposite direction when said armature is in a second position, the resultant flux caused by the current flow in said auxiliary winding and the current flow in said line winding effecting movement of said armature in response to a predetermined current level in the line.

5. A relay circuit comprising a relay having a line winding, an auxiliarly winding, and an armature, a switching circuit for reversing the direction of current in said auxiliary winding including two transistors, one of said transistors being designed to operate when said armature is in a first position and the other of said transistors being designed to operate when said armature is in a second position, said auxiliary winding being connected in said switching circuit between the outputs of said two transistors to control the direction of current flow through said auxiliary winding, the resultant flux caused by the current flow in said auxiliary winding and the current flow in said line winding effecting movement of said armature in response to a predetermined current level in the line.

6. A relay circuit comprising a relay having a line winding, an auxiliary winding, and an armature, a switching circuit for reversing the direction of current in said auxiliary winding including two switching transistors, one of said transistors being designed to conduct when said armature is in a first position and the other of said transistors being designed to conduct when said armature is in a second position, said auxiliary winding being connected between the output circuits of said two transistors and having the direction of current flow through said auxiliary winding determined by the conducting-nonconducting relationship of said two transistors, the resultant flux caused by the current flow in said auxiliary winding and the current flow in said line winding effecting movement of said armature from said first position to said second position in response to a current rise in said line to a predetermined level and from said second position back to said first position in response to a current drop in said line to a predetermined level.

7. A relay circuit comprising a relay having a line winding, an auxiliary winding, and an armature, a switching circuit for reversing the direction of current in said auxiliary winding including two switching transistors each having a variable resistor in its collector circuit, one of said transistors being designed to conduct when said armature is in a first position and the other of said transistors being designed to conduct when said armature is in a second position, said auxiliary winding being connected across the collector circuits of said two transistors and having the direction of current flow therethrough determined by the conducting-nonconducting relationship of said two transistors and having the value of said current determined in part by the value of the variable resistor in the collector circuit of the nonconducting transistor, the resultant flux caused by the current flow in said auxiliary winding and the current flow in said line winding effecting movement of said armature from said first position to said second position in response to current rise in said line to a predetermined level and from said second position back to said first position in response to a current drop in said line to a predetermined level.

8. A relay circuit comprising a relay having a line winding, an auxiliary winding, and an armature, a switching circuit for reversing the direction of current in said auxiliary winding including two switching transistors each having a variable resistor in its collector circuit, one of said transistors being designed to conduct when said armature is in a first position and the other of said transistors being designed to conduct when said armature is in a second position, said auxiliary winding being connected across the collector circuits of said two transistors and having the direction of current flow therethrough determined by the conducting-nonconducting relationship of said two transistors and having the value of said current determined in part by the value of the variable resistor in the collector circuit of the nonconducting transistor, the flux caused by the current flow in one direction in said auxiliary winding acting with the flux caused by current flow in said line winding to create a resultant flux which effects movement of said armature from said first position to said second position in response to a current rise in said line to a predetermined level and the flux caused by the current flow in the opposite direction in said auxiliary winding acting with the flux caused by the current flow in said line winding to create a resultant flux which effects movement of said armature from said second position back to said first position in response to a current drop in said line to a predetermined level, and a capacitor connected across said auxiliary winding to delay flux reversal in said auxiliary winding to permit the flux in the line winding to reach a prescribed level.

References Cited by the Examiner

UNITED STATES PATENTS

| 1,472,506 | 10/1923 | Van der Vort | 178—70 |
| 1,928,783 | 10/1933 | Finch | 178—70 |
| 3,042,900 | 7/1962 | Werts | 317—140 X |

MILTON O. HIRSHFIELD, *Primary Examiner.*

L. T. HIX, *Assistant Examiner.*